Patented Aug. 17, 1926.

1,596,596

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing. Application filed October 7, 1925. Serial No. 61,134.

This invention relates to the treatment of emulsions of mineral oil and water, such as petroleum emulsions, for the purpose of separating the oil from the water.

Petroleum emulsions are of the water-in-oil type and consist of oil constituting the continuous phase of the emulsion, droplets of water distributed throughout the body of oil and constituting the dispersed phase of the emulsion and films of matter that encase the droplets of water. They are obtained from producing wells and from the bottom of oil storage tanks and are commonly referred to as "cut oil", "roily oil", "emulsified oil" and "bottom settlings".

The object of my present invention is to provide a novel and inexpensive process for separating emulsions of the character referred to into their component parts of oil and water or brine.

Briefly described, my process consists in subjecting a petroleum emulsion to the action of a treating agent consisting of a poly-cyclic, sulphonic acid or the salt or ester thereof in such a manner that the emulsion will "break" and separate into its component parts of oil and water or brine when the emulsion is permitted to remain in a quiescent state after treatment.

Poly-cyclic, sulphonic acids capable of use with my process are obtained by introducing a sulphonic group or groups into a poly-cyclic body, such as an aromatic body containing two or more adjacent rings. The parent materials from which poly-cyclic compounds are obtained are naphthalene, anthracene and naphthacene, and the agent can be produced by the action of a sulphonating agent on naphthalene and anthracene. The agent can also be produced by the action of a sulphonating agent on the derivatives of said materials, such as naphthol, hydrogenated naphthalene; tetralin, halogenated naphthalene; chloro-naphthalene and chloro-anthracene. Due to the corrosive properties of the sulphonic acids themselves, I prefer to use the salts or esters of such acids in practising my process.

Various methods can be employed for producing or obtaining poly-cyclic, sulphonic acids suitable for use with my process, such as subjecting the poly-cyclic, aromatic material to the action of a sulphonating agent, such as sulphuric acid of various strengths; fuming sulphuric acid of various strengths; chloro-sulphonic acid; sulphur tri-oxide and similar other agents. The introduction of one or more sulphonic groups is controlled by the ratio of sulphonating agent to the poly-cyclic aromatic; by the temperature employed; by the time of contact and so forth. The salts of such acids are obtained by direct reaction of the acid material with suitable hydrates, such as sodium, potassium, ammonium, calcium, magnesium, iron and so forth. Sodium, potassium and ammonium hydrates produce water soluble salts. The esters of such acids are obtained by the usual method of submitting the sulphonic acid to reaction with an alcohol or hydroxylated body in the presence of a dehydrating agent.

In practising my process a treating agent consisting of a poly-cyclic sulphonic acid or the salt or ester thereof, is brought into contact with the emulsion either by introducing the treating agent into a well in which a petroleum emulsion is being produced; introducing the treating agent into a conduit through which a petroleum emulsion is flowing; introducing the treating agent into a tank in which a petroleum emulsion is stored; or introducing the treating agent into a container that holds a sludge obtained from the bottom of an oil storage tank. The treating agent can even be introduced into a producing well in such a way that it will become mixed with water and oil that is emerging from the ground before said water and oil enter the barrel of the well pump or the tubing up through which said water and oil flow to the surface of the ground. After treatment the emulsion is allowed to stand in a quiescent state at a suitable temperature so as to permit the water or brine to separate from the oil, or it may be passed through a variety of apparatus, such as hay tanks, gun barrels, etc. such as are now commonly used in the operation of "breaking" petroleum emulsions. It may even be passed through a centrifugal or electrical dehydrator.

Having thus described my invention, what I claim as new and desire to secure by Letters Patent is:

1. A process for treating petroleum emulsions, characterized by subjecting the emulsion to the action of a non-acidic treating agent containing a poly-cyclic, sulphonic group.

2. A process for treating petroleum emulsions, characterized by subjecting the emulsion to the action of a treating agent consisting of a water soluble salt of a poly-cyclic, sulphonic acid.

3. A process for treating petroleum emulsions, characterized by subjecting the emulsion to the action of a treating agent consisting of an alkali salt of a poly-cyclic, sulphonic acid.

4. A process for treating petroleum emulsions, characterized by subjecting the emulsion to the action of a treating agent consisting of an ammonium salt of a poly-cyclic, sulphonic acid.

5. A process for treating petroleum emulsions, characterized by subjecting the emulsion to the action of a treating agent consisting of a salt of a naphthalene, sulphonic acid.

6. A process for treating petroleum emulsions, characterized by subjecting the emulsion to the action of a treating agent consisting of a water soluble salt of a naphthalene, sulphonic acid.

7. A process for treating petroleum emulsions, characterized by subjecting the emulsion to the action of a treating agent consisting of an alkali salt of a naphthalene, sulphonic acid.

MELVIN DE GROOTE.

DISCLAIMER 1,596,596.—*Melvin de Groote*, St. Louis, Mo. PROCESS FOR TREATING PETROLEUM EMULSIONS. Patent dated August 17, 1926. Disclaimer filed October 8, 1940, by the assignee, *Petrolite Corporation, Ltd.*

Hereby enters this disclaimer to claims 1, 2, 3, and 4 in said specification.
[*Official Gazette November 5, 1940.*]